US012692050B2

(12) United States Patent
Han et al.

(10) Patent No.: US 12,692,050 B2
(45) Date of Patent: Jul. 28, 2026

(54) PORTABLE WATER BOTTLE CAP WITH BUILT-IN FILTER

(71) Applicant: ENVIONEER CO., LTD, Jecheon-si (KR)

(72) Inventors: Jeong Cheol Han, Suwon-si (KR); Seong Eun Park, Suwon-si (KR)

(73) Assignee: ENVIONEER CO., LTD, Jecheon-si (KR)

( * ) Notice: Subject to any disclaimer, the term of this patent is extended or adjusted under 35 U.S.C. 154(b) by 0 days.

(21) Appl. No.: 18/287,540

(22) PCT Filed: Aug. 18, 2022

(86) PCT No.: PCT/KR2022/012345
§ 371 (c)(1),
(2) Date: Oct. 19, 2023

(87) PCT Pub. No.: WO2024/034721
PCT Pub. Date: Feb. 15, 2024

(65) Prior Publication Data
US 2025/0074665 A1     Mar. 6, 2025

(30) Foreign Application Priority Data

Aug. 12, 2022     (KR) ........................ 10-2022-0101056

(51) Int. Cl.
B65D 47/08          (2006.01)
B65D 41/62          (2006.01)
(Continued)

(52) U.S. Cl.
CPC ............. B65D 41/62 (2013.01); B65D 47/32 (2013.01); C02F 1/002 (2013.01); C02F 2201/002 (2013.01); C02F 2307/02 (2013.01)

(58) Field of Classification Search
CPC ....................... C02F 2307/02; A45F 2003/163
See application file for complete search history.

(56) References Cited

U.S. PATENT DOCUMENTS 5,928,512 A      7/1999  Hatch et al.
6,004,460 A  *  12/1999  Palmer .................... C02F 1/003
                                              222/189.09
(Continued)

FOREIGN PATENT DOCUMENTS

CN          101171187 A      4/2008
CN          101568635 A      10/2009
(Continued)

OTHER PUBLICATIONS

Announcement on Internet Shopping Mall Sales Page, dated Jun. 1, 2022, 44 pages.

(Continued)

*Primary Examiner* — Allan D Stevens
(74) *Attorney, Agent, or Firm* — Birch, Stewart, Kolasch & Birch, LLP

(57)          ABSTRACT

The present invention relates to a portable water bottle cap with a built-in filter, and more particularly a portable water bottle cap with a built-in filter, the portable water bottle cap including a cap member removably coupled to an opening of a water bottle, a filter receiving member connected to the cap member at one side thereof, a filter member received in the filter receiving member, the filter member having a filter configured to filter foreign matter contained in water of the water bottle, and an air introduction member connected to the other side of the filter receiving member, the air introduction member being configured to guide air into the water bottle.

9 Claims, 7 Drawing Sheets

(51) Int. Cl.
  B65D 47/32 (2006.01)
  C02F 1/00 (2023.01)

(56) References Cited

U.S. PATENT DOCUMENTS

| | | | | |
|---|---|---|---|---|
| 6,395,170 | B1 | 5/2002 | Hughes et al. | |
| 6,569,329 | B1 * | 5/2003 | Nohren, Jr. | B01D 61/18 |
| | | | | 210/489 |
| 2005/0279768 | A1 * | 12/2005 | Chatrath | B01D 61/20 |
| | | | | 222/78 |
| 2006/0219740 | A1 | 10/2006 | Bayer | |
| 2009/0236341 | A1 * | 9/2009 | McKinney | A47G 19/2266 |
| | | | | 220/711 |
| 2010/0051534 | A1 | 3/2010 | Kisterev et al. | |
| 2021/0063286 | A1 * | 3/2021 | Hall | B65D 49/08 |
| 2021/0261436 | A1 | 8/2021 | Nedrelid | |

FOREIGN PATENT DOCUMENTS

| | | | | | |
|---|---|---|---|---|---|
| DE | 2726529 | A1 * | 12/1978 | | |
| DE | 202009003577 | U1 * | 7/2009 | | C02F 1/002 |
| JP | 5079022 | B2 | 11/2012 | | |
| JP | 2024-531018 | A | 8/2024 | | |
| KR | 1999-007793 | U | 2/1999 | | |
| KR | 20-2000-0002201 | U | 1/2000 | | |
| KR | 20-0215729 | Y1 | 3/2001 | | |
| KR | 20-0377104 | Y1 | 3/2005 | | |
| KR | 20110006832 | U * | 7/2011 | | |
| KR | 20120050002 | A * | 5/2012 | | |
| KR | 20-2014-0001519 | U | 3/2014 | | |
| KR | 20160027145 | A * | 3/2016 | | |
| KR | 102156520 | B1 * | 9/2020 | | |
| KR | 20220004602 | A * | 1/2022 | | |
| WO | WO-2020154417 | A1 * | 7/2020 | | B65D 77/225 |
| WO | WO-2020189950 | A1 * | 9/2020 | | B01D 35/02 |

OTHER PUBLICATIONS

Announcement on Internet Shopping Mall Sales Page, dated May 25, 2022, 4 pages.
Na, "Envioneer Acquires Chinese Patent Related to Cap Filter . . . Attacks Global B2C Markets", Publication Presentation Internet Article, Mar. 17, 2022, 6 pages.

* cited by examiner

【FIG. 1】
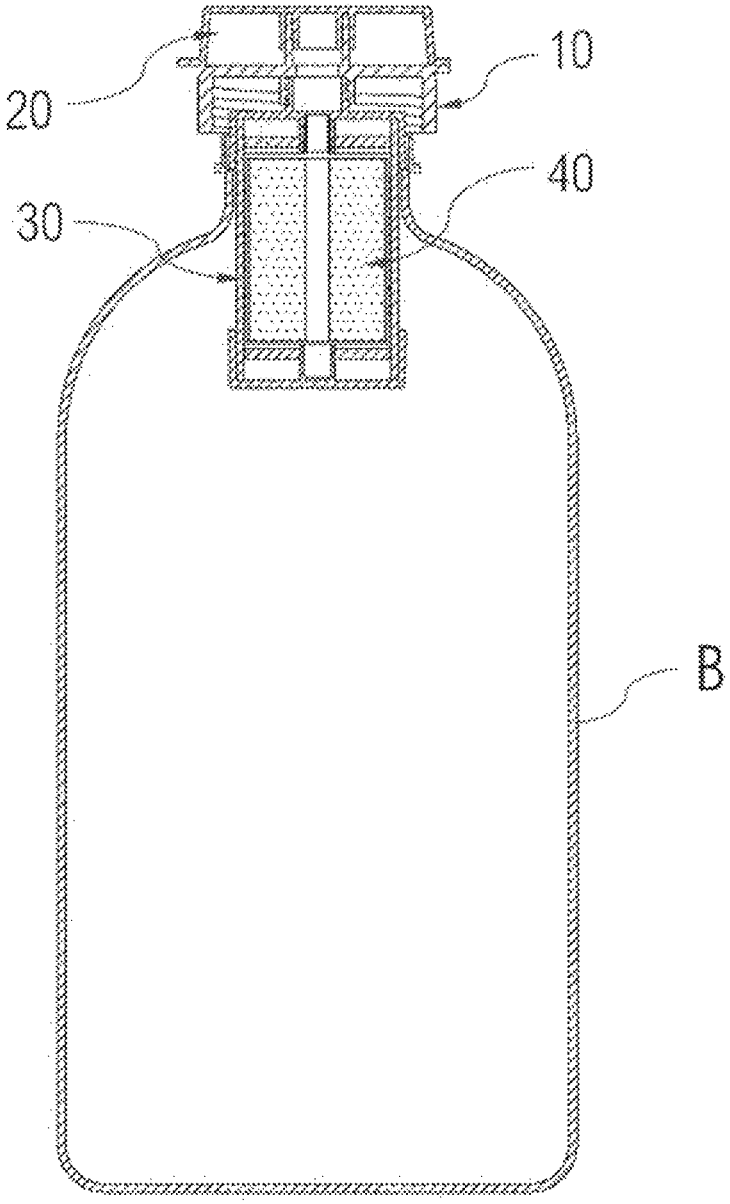
Prior Art

【FIG. 2】
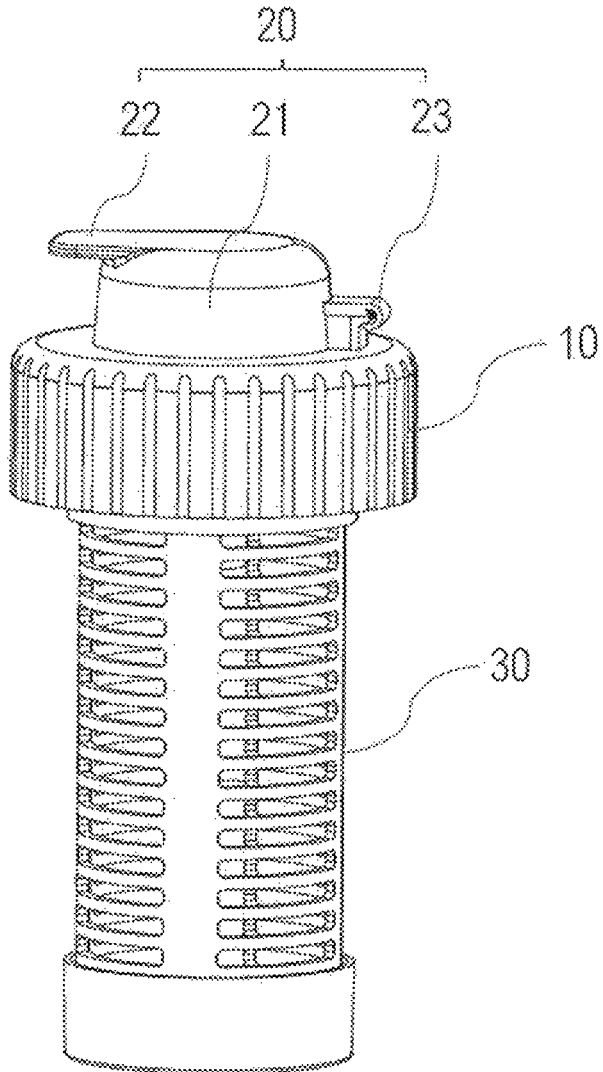
Prior Art

【FIG. 3】
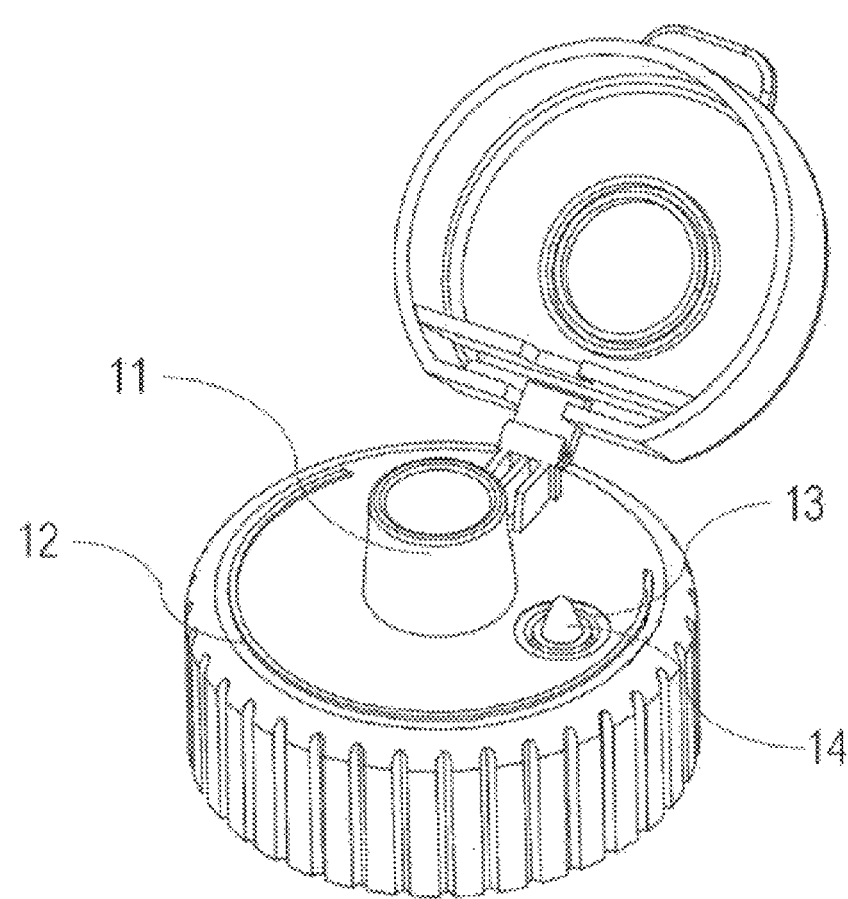
Prior Art

【FIG. 5】
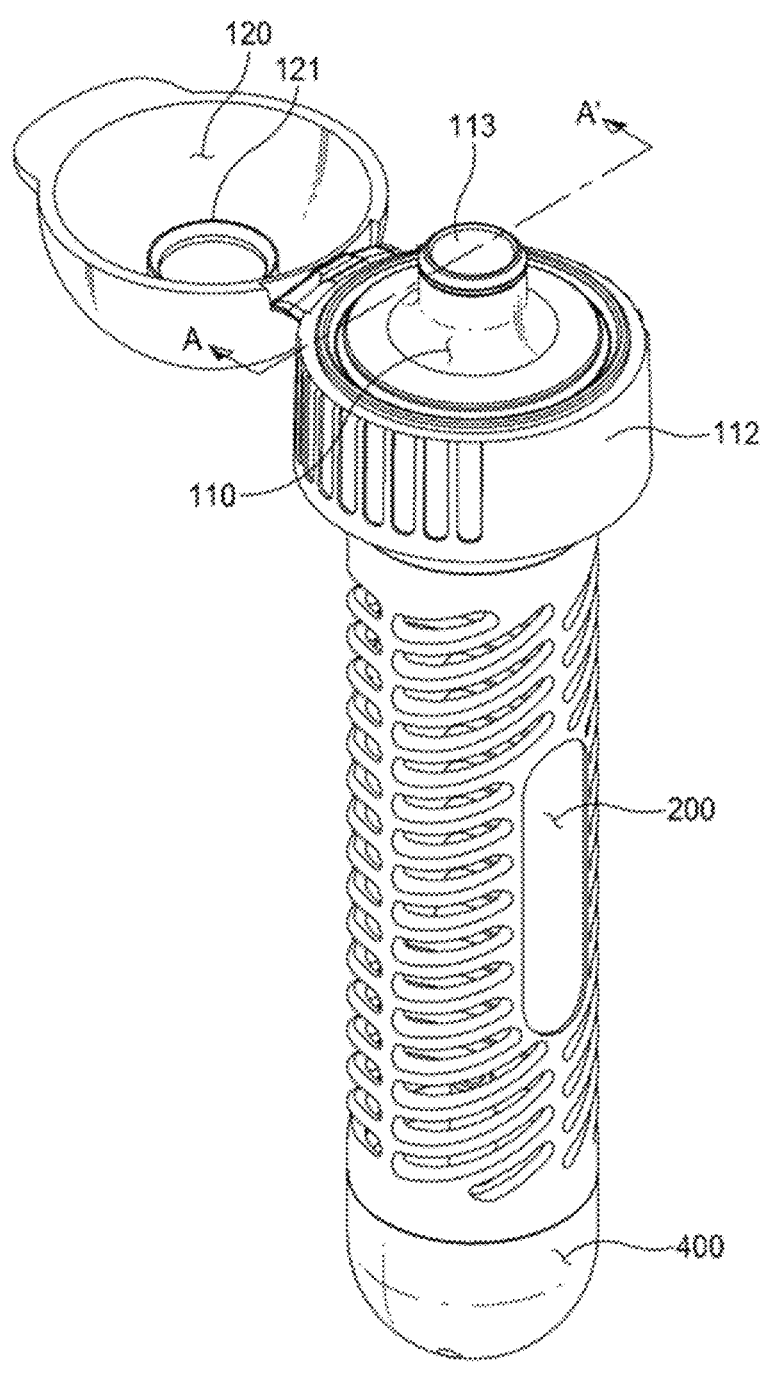

【FIG. 6】
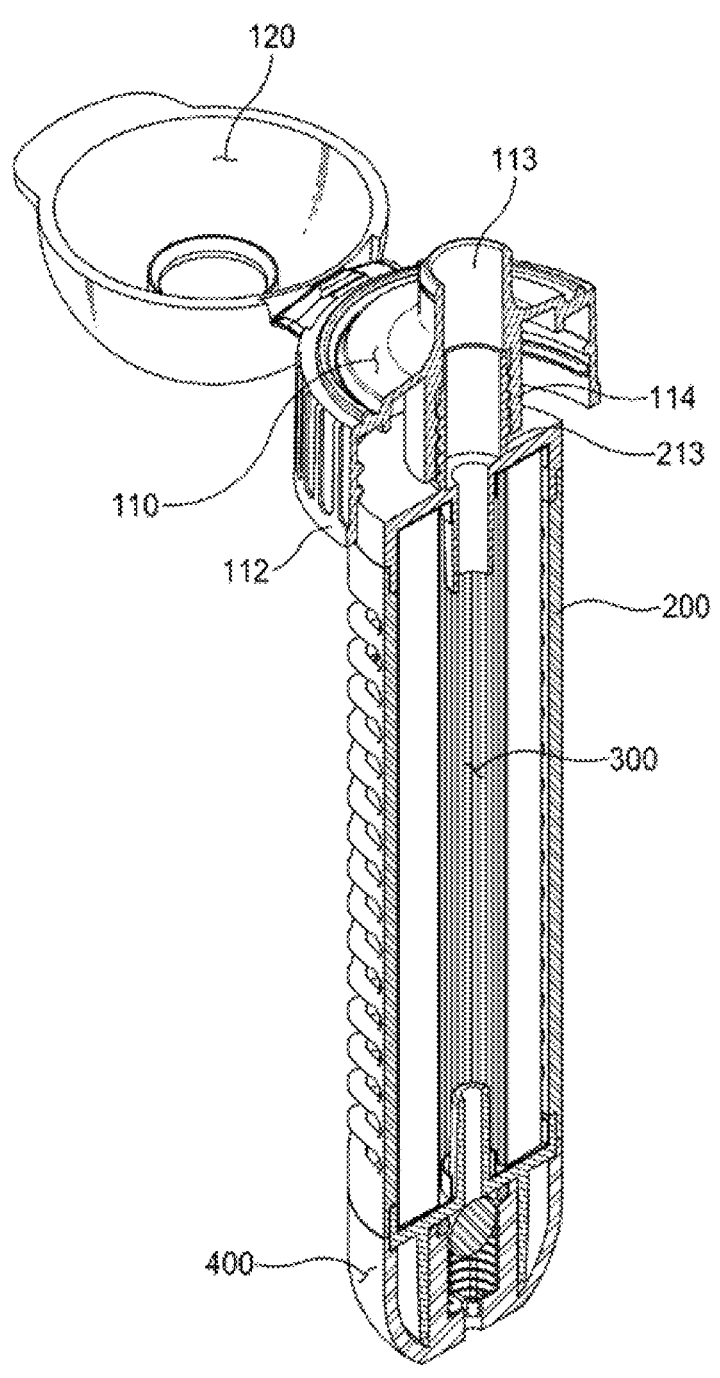

【FIG. 7】
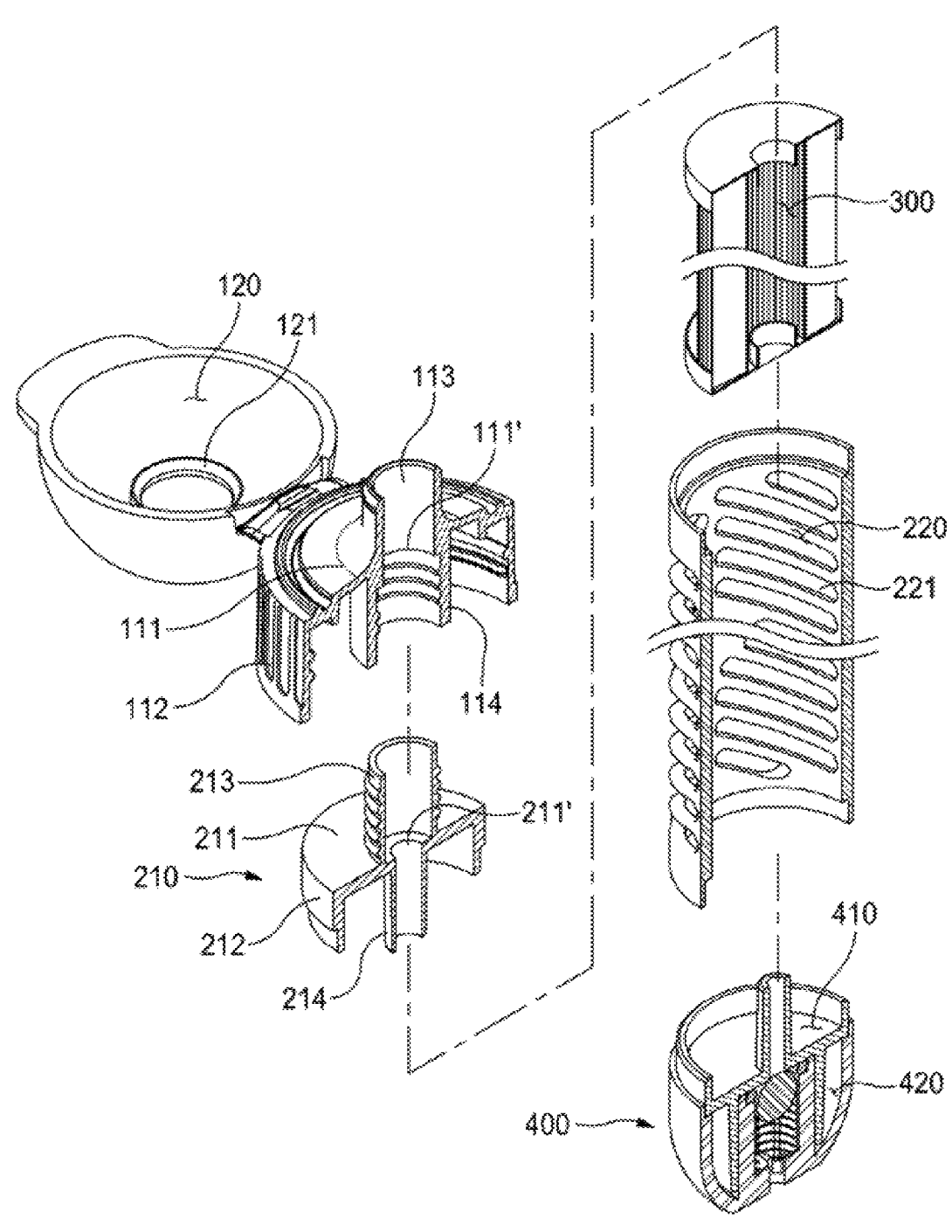

【FIG. 9】
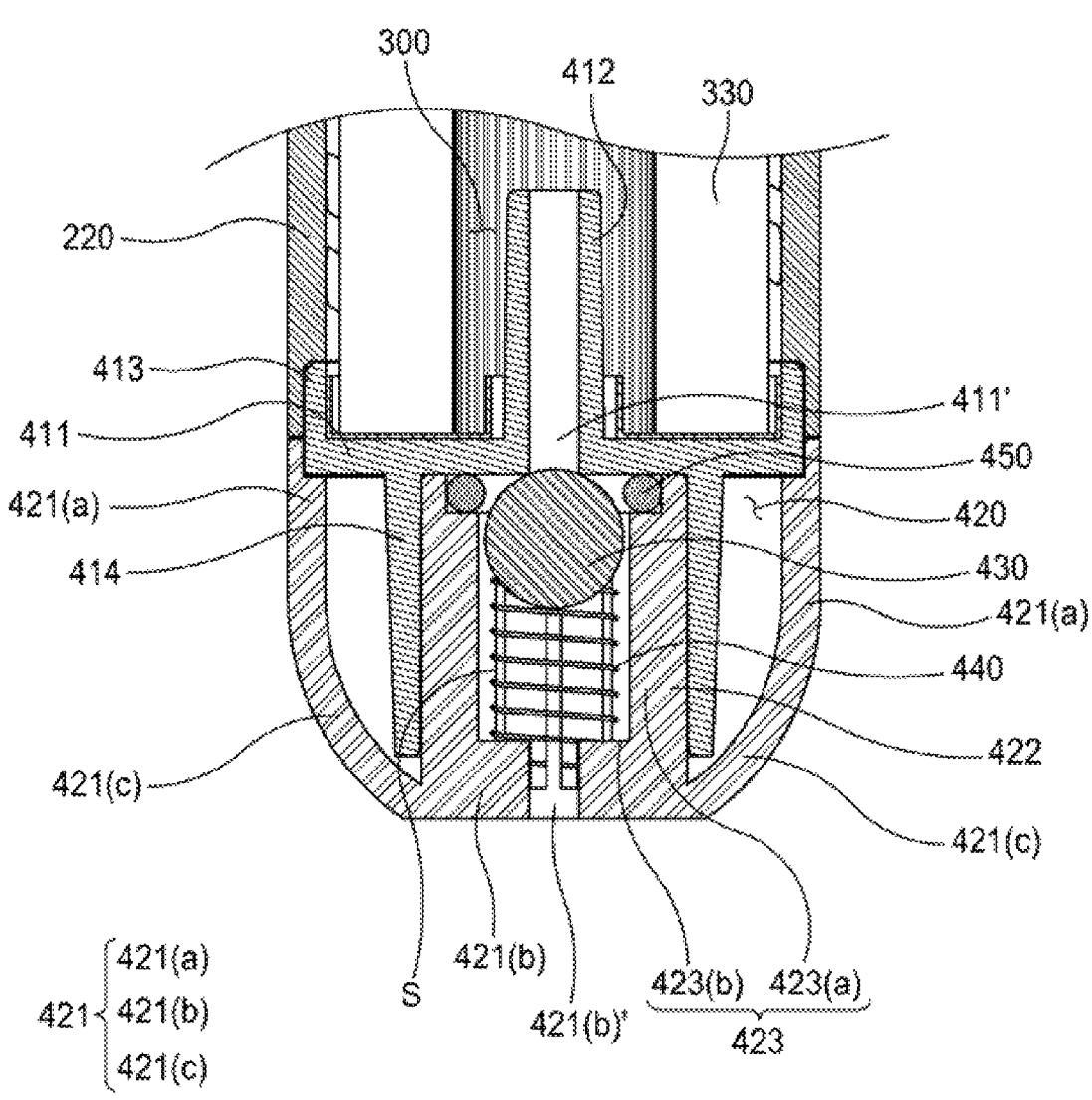

PORTABLE WATER BOTTLE CAP WITH BUILT-IN FILTER

CROSS REFERENCE TO RELATED APPLICATIONS

This application is the National Phase of PCT International Application No. PCT/KR2022/012345, filed on Aug. 18, 2022, which claims priority under 35 U.S.C. 119(a) to Patent Application No. 10-2022-0101056. filed in the Republic of Korea on Aug. 12, 2022, all of which are hereby expressly incorporated by reference into the present application.

TECHNICAL FIELD

The present invention relates to a portable water bottle cap with a built-in filter, and more particularly to a portable water bottle cap with a built-in filter capable of completely removing various kinds of foreign matter contained in water, wherein the portable water bottle is removably coupled to a portable water bottle, whereby the portable water bottle cap can be repeatedly used.

BACKGROUND ART

Due to increasingly severe environmental pollution, the water quality of various water systems, such as rivers, lakes, and dams, which are water sources, is deteriorating, and advanced water treatment processes using ozone, activated carbon, and separation membranes are being introduced and operated in most water treatment processes in order to produce and supply safe drinking water.

Due to the distrust of tap water, however, expensive water purifiers have been installed in an increasing number of households and offices or bottled water has been purchased for drinking. Although commercially available bottled water is recognized as safe from bacteria and harmful substances through strict quality control, bottled water is made from bedrock water or groundwater in many cases. Once groundwater is contaminated, it is substantially impossible to remove contaminants, and it is also impossible to prevent the contaminated groundwater from migrating elsewhere, and therefore it cannot be said that bottled water is safe.

Meanwhile, people are increasingly concerned about improving their quality of life and their health, and therefore they buy bottled water for various kinds of exercise, mountain climbing, various recreational activities, and drinking enough water, or use tap water in portable water bottles.

Even though water is sterilized, however, the water may be contaminated by bacteria suspended in air as the result of contact with the air, whereby food poisoning may result, or many consumers are reluctant to drink tap water due to odors from chemicals added to a water source or during a water purification process.

In particular, when traveling abroad, it is difficult to drink water due to differences in water quality characteristics and water treatment processes in different countries, and in some cases, people may suffer from serious diseases.

As a prior art for solving the above problems, Prior Document 1 (Korean Registered Utility Model Publication No. 0215729) discloses a water filter for portable water bottles, wherein the water filter includes a coupling portion coupled to a portable water bottle so as to close a water inlet, the coupling portion being provided in a region thereof with a water outlet, and a water purification portion coupled to the coupling portion, the water purification portion being configured to purify water received in the portable water bottle and to guide the same to the water outlet.

According to Prior Document 1, a water filter having a water purification device is coupled to the portable water bottle, whereby it is possible to purify water contained in the portable water bottle, and therefore it is possible to drink the water in peace. Since the entirety of the water filter including the coupling portion and the water purification portion must be replaced, however, replacement cost is high, and moreover there limitations in removing are still hardness-causing substances and odors that are dissolved in the water.

Accordingly, the applicant of the present application filed Prior Document 2 (Korean Registered Patent Publication No. 2156520) relating to a portable water bottle cap with a filtration function as an application, which has been registered as a patent.

As shown in FIGS. 1 to 3, the technology disclosed in Prior Document 2 includes a fixture 10 removably coupled to an outer surface of an opening of a water bottle B, a cap portion 20 located on the fixture 10, a filter receiving member 30 located under the fixture 10, and a filter member 40 configured to filter foreign matter contained in water of the water bottle B.

The cap portion 20, which is configured to open and close a discharge portion 11 and to prevent external foreign matter from being introduced into the water bottle, includes a cap body 21, an extension portion 22 configured to allow the cap body 21 to be easily leaned back, and a connection 23 configured to connect the extension portion 22 and the cap body 21 to each other.

In addition, the discharge portion 11 is located in the center of a first plane portion of the fixture 10, and a raised wall 12 configured to fix the cap portion 20, an air introduction portion 13 configured to guide air into the water bottle B, and a moving piece 14 configured to open and close the air introduction portion 13 are provided at the periphery of the discharge portion 11.

In particular, the moving piece 14, which opens and closes the air introduction portion 13, is configured to introduce air into the water bottle. That is, when drinking water from the water bottle, the water bottle is pressed by hand in a state of holding the discharge part 11 in the mouth. Since the volume of the water bottle decreases in proportion to the volume of the water consumed, it is difficult to further press the water bottle, and if there is little water remaining, the water cannot be discharged well. Even though there is little water remaining in the water bottle, therefore, it is possible to conveniently drink water by the provision of the air introduction portion 13 and the moving piece 14.

However, the moving piece 14 is constituted by a conical head, a cylindrical body, and a flat tail, each of which is made of an elastic material, and opening and closing of the air introduction portion 13 is affected by the internal pressure of the water bottle, the weight of the moving piece 14, and a change in shape of the moving piece 14, whereby the moving piece may not work properly.

PRIOR ART DOCUMENTS (Prior Document 1) Korean Registered Utility Model Publication No. 0215729

(Prior Document 2) Korean Registered Patent Publication No. 2156520

DISCLOSURE

Technical Problem

The present invention has been made in view of the above problems, and it is an object of the present invention to provide a portable water bottle cap with a built-in filter capable of completely blocking foreign matter or bacteria contained in water while being replaced at low cost.

It is another object of the present invention to provide a portable water bottle cap with a built-in filter configured such that, even though the volume of a water bottle decreases after drinking, air is rapidly introduced into the water bottle, whereby convenience of drinking is improved.

Technical Solution

A portable water bottle cap with a built-in filter according to the present invention to accomplish the above objects includes a cap member (100) removably coupled to an opening of a water bottle, a filter receiving member (200) connected to the cap member (100) at one side thereof, a filter member (300) received in the filter receiving member (200), the filter member having a filter configured to filter foreign matter contained in water of the water bottle, and an air introduction member (400) connected to the other side of the filter receiving member (200), the air introduction member being configured to guide air into the water bottle.

Also, in the portable water bottle cap with the built-in filter according to the present invention, the cap member (100) may include a fixture (110) constituted by a first circular plate (111) having a first through-hole (111') and a first sidewall (112), the fixture being cylindrical in shape, the first circular plate (111) being provided at one side thereof with a discharge port (113) protruding by a predetermined length, the first circular plate (111) being provided at the other side thereof with a holder (114) configured to communicate with the discharge port (113), the holder having a predetermined length, the fixture being removably coupled to the opening of the water bottle, and a cap portion (120) configured to open and close the discharge port (113) in a state of being connected to the fixture (110).

Also, in the portable water bottle cap with the built-in filter according to the present invention, the filter receiving member (200) may include an upper support portion (210) fastened to one side of the filter member (300) and a side support portion configured to enclose a side surface of the filter member (300), the side support portion being cylindrical in shape, one side of the side support portion being connected to the upper support portion (210), the upper support portion (210) may be constituted by a second circular plate (211) having a second through-hole (211') and a second sidewall (212), the upper support portion being cylindrical in shape, the second circular plate (211) being provided at one side thereof with a first connection member (213) configured to be brought into tight contact with an inner surface of the holder (114), the first connection member being cylindrical in shape, the first connection member having a predetermined length, the second circular plate (211) being provided at the other side thereof with a second connection member (214) configured to communicate with the second through-hole (211') and to be brought into tight contact with one side of the filter member (300), the second connection member having a predetermined length, and the side support portion (220) may be provided with a plurality of slits (221) configured to allow water in the water bottle to pass therethrough, each of the slits being cylindrical in shape.

Also, in the portable water bottle cap with the built-in filter according to the present invention, the air introduction member (400) may include a first body (410) including a third circular plate (411) having a third through-hole (411') and a third connection member (412) extending to one side of the third circular plate (411) so as to be brought into tight contact with the other side of the filter member (300), a second body (420) located at the other side of the first body (410), the second body having a fourth through-hole (421(b)') configured to allow air to be introduced therethrough, a ball (430) received in the second body (420), the ball being located on the same line as the fourth through-hole (421(b)'), and a spring (440) received in the second body (420), the spring being configured to support the ball (430).

Also, in the portable water bottle cap with the built-in filter according to the present invention, the first body (410) may further include a first extension portion (413) located at an edge of one side of the third circular plate (411) so as to be fixed to the other side of the side support portion (220) of the filter receiving member (200) and a second extension portion (414) extending from the other side of the third circular plate (411) toward the interior of the second body (420).

Also, in the portable water bottle cap with the built-in filter according to the present invention, the first extension portion (413) may be fixed to the side support portion (220) of the filter receiving member (200) in a state of being depressed therein.

Also, in the portable water bottle cap with the built-in filter according to the present invention, the inner diameter of the first extension portion (413) may be equal to the inner diameter of the side support portion (220) of the filter receiving member (200).

Also, in the portable water bottle cap with the built-in filter according to the present invention, the second body (420) may include a cover (421) constituted by a third sidewall (421(a)) formed in a cylindrical shape, a bottom plate (421(b)) having the fourth through-hole (421(b)') formed therein, and a fourth sidewall (421(c)) configured to connect the third sidewall (421(a)) and the bottom plate (421(b)) to each other, an inner sidewall (422) located at an inside of the cover (421), the inner sidewall extending by a predetermined length, the inner sidewall being cylindrical in shape, and a rib (423) constituted by a plurality of first ribs (423(a)) located on an inner surface of the inner sidewall (422), the first ribs extending in a height direction while being spaced apart from each other by a predetermined distance and a plurality of second ribs (423(b)) located on an inner upper surface of the bottom plate (421(b)), the second ribs being radially disposed while protruding by a predetermined height, the second ribs being configured to support one side of the spring (440), and the ball (430) may move upwards and downwards along the first ribs (423(a)) above the second ribs (423(b)).

Also, in the portable water bottle cap with the built-in filter according to the present invention, an upper end of the third sidewall (421(a)) may be located under the first extension portion (413).

Also, in the portable water bottle cap with the built-in filter according to the present invention, the first extension portion (413) may be fixed to the side support portion (220) of the filter receiving member (200) in a state of being depressed therein, the inner diameter of the first extension portion (413), the inner diameter of the side support portion (220) of the filter receiving member (200), and the inner diameter of the third sidewall (421(a)) may be equal to each other, and the outer diameter of the side support portion (220) of the filter receiving member (200) and the outer diameter of the third sidewall (421(a)) may be equal to each other.

Also, in the portable water bottle cap with the built-in filter according to the present invention, the fourth sidewall (421(*c*)) may have an inner diameter gradually decreasing toward the bottom plate (421(*b*)).

Also, in the portable water bottle cap with the built-in filter according to the present invention, the second extension portion (414) may be located so as to enclose the outside of the inner sidewall (422).

Also, in the portable water bottle cap with the built-in filter according to the present invention, the spring (440) may be a coil located between the ball (430) and the second ribs (423(*b*)).

Advantageous Effects

A portable water bottle cap with a built-in filter according to the present invention has a merit in that it is possible to completely remove foreign matter and bacteria contained in water, whereby it is possible to protect the health of a drinker.

In addition, the portable water bottle cap with the built-in filter according to the present invention has an advantage in that outside air is introduced into the water bottle by the pressure in the water bottle and elastic force of a spring, whereby it is possible to improve convenience of drinking.

In addition, the portable water bottle cap with the built-in filter according to the present invention has a merit in that a coil spring is seated on a plurality of secondary ribs radially disposed while being located outside a fourth through-hole, whereby the fourth through-hole is prevented from being blocking by a ball even though the pressure difference between the inside and outside of the water bottle is large, and therefore it is possible for outside air to be easily introduced into the water bottle.

DESCRIPTION OF DRAWINGS

FIG. 1 is a schematic view showing the state in which a conventional cap with a built-in filter member is mounted to a portable water bottle.

FIG. 2 is a side view of the conventional water bottle cap.

FIG. 3 is a perspective view showing the state in which a cap portion of the conventional water bottle cap is open in a state of being connected to a fixture.

FIG. 4 is an enlarged perspective view of a cap member of a portable water bottle cap with a built-in filter according to a preferred embodiment of the present invention.

FIG. 5 is a perspective view of the portable water bottle cap with the built-in filter according to the preferred embodiment of the present invention.

FIG. 6 is a cutaway perspective view of the portable water bottle cap with the built-in filter taken along line A-A' of FIG. 5.

FIG. 7 is an exploded view of the cutaway perspective view shown in FIG. 6.

FIG. 8 is a perspective view of a filter member built in the portable water bottle cap according to the preferred embodiment of the present invention.

FIG. 9 is a partial enlarged view of FIG. 7, showing a sectional view of a side support portion and an air introduction member.

FIG. 10 is an exploded perspective view of the side support portion and the air introduction member shown in FIG. 9.

FIG. 11 is an enlarged perspective view of the interior of a second body constituting the air introduction member.

FIG. 12 is an enlarged perspective view of the exterior of the second body constituting the air introduction member.

BEST MODE

Hereinafter, a portable water bottle cap with a built-in filter according to the present invention will be described with reference to the accompanying drawings.

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, all terms, including technical and scientific terms, have the same meanings as those commonly understood by one of ordinary skill in the art to which the present invention pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

FIG. 4 is an enlarged perspective view of a cap member of a portable water bottle cap with a built-in filter according to a preferred embodiment of the present invention, and FIG. 5 is a perspective view of the portable water bottle cap with the built-in filter according to the preferred embodiment of the present invention. In addition, FIG. 6 is a cutaway perspective view of the portable water bottle cap with the built-in filter shown in FIG. 5, FIG. 7 is an exploded view of the cutaway perspective view shown in FIG. 6, and FIG. 8 is a perspective view of a filter member built in the portable water bottle cap according to the preferred embodiment of the present invention.

A water bottle cap according to the present invention has a built-in filter. At the time of drinking, therefore, water passes through the filter, and therefore bacteria and various kinds of foreign matter, including hardness-causing substances, contained in water in a water bottle are removed.

As shown in FIGS. 4 to 8, the portable water bottle cap with the built-in filter according to the present invention having the above function includes a cap member 100 removably coupled to an opening of the water bottle, a filter receiving member (filter receiver) 200 connected to the cap member 100 at one side thereof, a filter member 300 received in the filter receiving member 200, the filter member having a filter configured to filter foreign matter contained in water of the water bottle, and an air introduction member (air introducer) 400 connected to the other side of the filter receiving member 200, the air introduction member being configured to guide air into the water bottle.

First, the cap member 100 removably coupled to the opening of the water bottle will be described in detail.

The cap member 100 includes a fixture (cap fixer) 110 and a cap portion 120 removably coupled to the water bottle opening.

Specifically, the fixture 110 is cylindrical in shape, including a first circular plate 111 having a first through-hole 111' in the center thereof and a first sidewall 112 having formed thereon a plurality of protrusions configured to help prevent the cap from slipping from the hand when the cap is mounted to or removed from the water bottle. In addition, a discharge port 113 protruding by a predetermined length is provided at one side of the first circular plate 111 such that water can be discharged into the mouth when the water bottle is held in the mouth or is pressed by hand for drinking. The first circular plate 111 is provided at the other side thereof with a holder 114 communicating with first through-hole 111' and the discharge port 113, the holder having a predetermined length. The holder 114 is connected to an upper support portion 210 constituting the filter receiving member 200.

A female thread configured to engage with an outer surface of the opening of the water bottle by male-female thread engagement may be formed at an inner side of the first sidewall 112.

The cap portion 120 is configured to prevent external foreign matter from being introduced into the water bottle and to prevent the discharge port 113 from being contaminated, and is rotatably connected to the fixture 110 in a hinged manner. In particular, when the cap portion 120 is further provided at an inner side thereof with an auxiliary cap portion 121 disposed at an inner surface or an outer surface of the discharge port 113 in tight contact therewith, it is possible to reliably prevent introduction of foreign matter or contamination of the discharge port 113.

The filter receiving member 200 connected to the cap member 100 at one end thereof will be described. The filter receiving member 200 includes an upper support portion 210 fastened to one side of the filter member 300 and a side support portion 220 configured to enclose a side surface of the filter member 300.

First, the upper support portion 210 has cylindrical shape, including a second circular plate 211 with a second through-hole 211' in the center thereof and a second sidewall 212.

A cylindrical first connection member (first connector) 213 having a predetermined length so as to be brought into tight contact with an inner surface of the holder 114 in a state of being inserted therein is provided at one side of the second circular plate 211, i.e. the surface of the second circular plate that faces the cap member 100, and a second connection member (second connector) 214 having a predetermined length so as to be brought into tight contact with a fastening hole 311 of the filter member 300 in a state of being inserted therein is provided at the other side of the second circular plate 211.

At this time, the first connection member 213, the second through-hole 211', and the second connection member 214 communicated with each other, whereby the water that has passed through the filter 330 sequentially passes through the second connection member 214, the second through-hole 211', and the first connection member 213. Of course, the water that has passed through the first connection member 213 is discharged through the discharge port 113 via the holder 114.

Meanwhile, the holder 114 and the first connection member 213 are preferably brought into tight contact with each other in order to prevent water leakage, and are more preferably fixed to each other by male-female thread engagement or using a known adhesive.

The side support portion 220 has a hollow cylindrical shape so as to receive the filter member 300, and is provided with a plurality of slits 221 such that the water in the water bottle can be introduced into the filter member 300. One side of the side support portion 220, i.e. the end of the side support portion that faces the upper support portion 210, is fixed to an inner surface of the second sidewall 212 of the upper support portion 210 by male-female thread engagement or using an adhesive.

The filter member 300 is received in the filter receiving member 200 so as to filter out foreign matter contained in the water, and includes a first sealing portion 310, a second sealing portion 320, and a filter 330.

The first sealing portion 310 fixes an upper part of the filter 330, and is provided in the center thereof with a fastening hole 311, into which the second connection member 214 is inserted, whereby the first sealing portion communicates with the first connection member 213. The second sealing portion 320 is located spaced apart from the first sealing portion 310 by a predetermined distance, and fixes a lower part of the filter 330.

Here, the filter 330 is preferably formed in a corrugated shape with a predetermined number of folds in a longitudinal direction, the reason for which is that it is possible to increase the surface area of the filter per unit volume and furthermore to easily maintain the shape of the filter. Of course, it is obvious that the filter 330 is provided in the center thereof with a filtered water passageway (not shown) formed in the longitudinal direction such that water that has been introduced from the outside of the filter and has passed through the filter can move to the inside of the second connection member 214.

FIG. 9 is a partial enlarged view of FIG. 7, showing a sectional view of the side support portion and the air introduction member, and FIG. 10 is an exploded perspective view of the side support portion and the air introduction member shown in FIG. 9. In addition, FIG. 11 is an enlarged perspective view of the interior of a second body constituting the air introduction member, and FIG. 12 is an enlarged perspective view of the exterior of the second body constituting the air introduction member.

The air introduction member 400 will be described in detail with reference to FIGS. 9 to 12.

The air introduction member 400, which is configured to guide air into the water bottle, is coupled to the other side of the side support portion 220, and includes a first body 410, a second body 420, a ball 430, a spring 440, and a packing member 450.

First, the first body 410 includes a third circular plate 411, a third connection member (third connector) 412, a first extension portion (first extension) 413, and a second extension portion (second extension) 414. The third circular plate 411 is where the second sealing portion 320 of the filter member is seated, and is provided in the center thereof with a third through-hole 411', through which air that has passed through the filtered water passageway of the filter can be introduced into the water bottle.

The third connection member 412 has a cylindrical shape extending from the center of the third circular plate 411, more specifically from the outside of the third through-hole 411', in a state of protruding toward the filter member by a predetermined length. The third connection member 412 is inserted into the fastening hole (not shown) located under the filter member, and provides a passageway for water and air while fixing the filter member.

The first extension portion 413 is located at an edge of the third circular plate 411 so as to face the filter member, is cylindrical in shape, and is fixed to the other side of the side support portion 220.

Here, the first extension portion 413 is preferably fixed to the side support portion 220 of the filter receiving member in a state of being depressed therein, the reason for which is that the first extension portion 413 and the side support portion 220 can be securely fixed to each other.

Also, in order to prevent the filter member 300 received in the filter receiving member and the first extension portion 413 from colliding with each other and furthermore to prevent an unnecessary increase in volume of the filter receiving member 200, it is more preferable for the inner diameter of the first extension portion 413 to be equal to the inner diameter of the side support portion 220 of the filter receiving member.

The second extension portion 414 has a cylindrical shape extending in a state of protruding by a predetermined length in a direction toward the other side of the third circular plate 411, i.e. the interior of the second body 420, and is formed so as to enclose an inner sidewall 422, a description of which will follow, in tight contact with an outer surface of the inner sidewall 422.

The second body 420 is located at the other side of the first body 410, i.e. under the first body 410, is hollow so as to receive the ball 430, the spring 440, and the packing member 450, and includes a cover 421, an inner sidewall 422, and a rib 423.

First, the cover 421 forms the appearance of the second body 420, and includes a cylindrical third sidewall 421(*a*), a circular bottom plate 421(*b*), and a fourth sidewall 421(*c*) configured to connect the third sidewall 421(*a*) and the bottom plate 421(*b*) to each other.

Here, a part of an upper end of the third sidewall 421(*a*) is located under the first extension portion 413, and the remaining part thereof is located under the side support portion 220 of the filter receiving member. That is, the thickness of the third sidewall 421(*a*) is equal to the thickness of the side support portion 220 with the result that the outer diameter of the third sidewall 421(*a*) and the outer diameter of the side support portion 220 are equal to each other, and furthermore the inner diameter of the first extension portion 413, the inner diameter of the side support portion 220, and the inner diameter of the third sidewall 421(*a*) are equal to each other.

In the above configuration, the side support portion 220, the first body 410, and the cover 421 may be securely fixed to each other, and the side support portion 220 and the second body 420 may be integrally formed.

The fourth sidewall 421(*c*) preferably has an inner diameter gradually decreasing toward the bottom plate 421(*b*), the reason for which is that it is possible to easily insert the air introduction member 400 into the opening of the water bottle. Reference symbol 421(*c*)' indicates a fifth through-hole, which is configured to allow water to flow into or from the space between the second extension portion 414 and the third sidewall 421(*a*) therethrough.

Meanwhile, a fourth through-hole 421(*b*)', through which air from the outside is introduced the water bottle, is formed in the circular bottom plate 421(*b*)

The inner sidewall 422 has a cylindrical shape extending upwards from the bottom plate 421(*b*) by a predetermined length, and is fixed to an inner surface of the second extension portion 414 in tight contact therewith.

The rib 423 includes a first rib 423(*a*) and a second rib 423(*b*). The first rib 423(*a*) is located on an inner surface of the inner sidewall 422, and is constituted by a plurality of ribs extending in a height direction while being spaced apart from each other by a predetermined distance, forming a radial shape when viewed from above. Here, the outer shape of the first rib 423(*a*) may be, but is not necessarily limited to, a rectangular hexahedron or a cylinder.

The first rib 423(*a*) provides a movement path for the ball 430 and the spring 440 and prevents the ball 430 and the spring 440 from being brought into tight contact with the inner sidewall 422, whereby a space portion S, which is a movement path for air, is provided.

In addition, the second rib 423(*b*) is located on an inner upper surface of the bottom plate 421(*b*), more specifically between the fourth through-hole 421(*b*)' and the inner sidewall 422. A plurality of bars is radially disposed to prevent the ball 430 from blocking the fourth through-hole 421(*b*)'. Here, the second rib 423(*b*) may be formed in the shape of a rectangular hexahedron or a cylinder, in the same manner as the first rib 423(*a*); however, the present invention is not limited thereto.

The ball 430 moves upwards and downwards along the first rib 423(*a*) to determine whether to open or close the third through-hole 411'. One side of the coil-shaped spring 440 is located on the second rib 423(*b*) and the other side thereof is disposed so as to support the ball 430, whereby upward and downward movement of the ball 430 is controlled.

Reference numeral 450 indicates a packing member, which may be a circular O-ring configured to completely blocking water and air but may be omitted if sufficient airtightness is achieved using only the ball 430.

When the portable water bottle cap with the built-in filter having the above structure is mounted to a water bottle and the water bottle is pressed by hand in order to drink water, the ball 430 blocks the third through hole 411' due to external pressure applied to the water bottle and elastic force of the spring 440, whereby water is introduced into the side support portion 220 of the filter receiving member 200 and is discharged to the outside via the filter 330, the second connection member 214, the holder 114, and the discharge port 113.

After drinking the water, the volume of the water bottle decreases, whereby the pressure in the water bottle is lower than the outside, and therefore outside air sequentially flows through the discharge port 113, the holder 114, the second connection member 214, the filtered water passageway of the filter 330, the third connection member 412, and the third through-hole 411' and is introduced into the water bottle through the fourth through-hole 421(*b*)'. As a result, the water bottle returns to the original volume thereof.

Although the specific details of the present invention have been described in detail, those skilled in the art appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Cap member
110: Fixture
111: circular plate 111': First through-hole
112: First sidewall
113: Discharge port 114: Holder
120: Cap portion 121: Auxiliary cap portion
200: Filter receiving member
210: Upper support portion
211: Second circular plate 211': Second through-hole
212: First sidewall 213: First connection member
214: Second connection member
220: Side support portion 221: Slit
300: Filter member
310: First sealing portion 311: Fastening hole
320: Second sealing portion
330: Filter
400: Air introduction member
410: First body
411: Third circular plate 411': Third through-hole
412: Third connection member 413: First extension portion 414: Second extension portion
420: Second body
421: Cover
421(*a*): Third sidewall 421(*b*): Bottom plate
421(*b*)': Fourth through-hole
421(*c*): Fourth sidewall 421(*c*)': Fifth through-hole
422: Inner sidewall 423: rib
423(*a*): First rib 423(*b*): Second rib
430: Ball
440: Spring
450: Packing member
S: Space portion

The invention claimed is:

1. A water bottle cap comprising:

a cap configured to be removably coupled to an opening of a water bottle;

a filter receiver connected to the cap at one side thereof;

a filter member received in the filter receiver, the filter member being configured to filter foreign matter contained in water; and an air introducer connected to the other side of the filter receiver, the air introducer being configured to guide air, wherein the cap comprises:

a cap fixer constituted by a first circular plate and a first sidewall, the first circular plate having a first through-hole, the cap fixer being cylindrical in shape, the first circular plate being provided at one side thereof with a discharge port protruding by a predetermined length, the first circular plate being provided at the other side thereof with a holder configured to allow fluid communication with the first through-hole and the discharge port, the holder having a predetermined length, the first sidewall having a thread formed at an inner side configured to engage with an outer surface of the opening of the water bottle, the cap fixer being configured to be removably coupled to the opening of the water bottle; and a cap portion configured to open and close the discharge port in a state of being connected to the cap fixer, wherein the filter receiver comprises:

an upper support portion fastened to one side of the filter member; and a side support portion configured to enclose a side surface of the filter member, the side support portion being cylindrical in shape, one side of the side support portion being connected to the upper support portion, wherein the upper support portion is constituted by a second circular plate and a second sidewall, the second circular plate having a second through-hole, the upper support portion being cylindrical in shape, the second circular plate being provided at one side thereof with a first connector configured to be brought into tight contact with an inner surface of the holder, the first connector being cylindrical in shape, the first connector having a predetermined length, the second circular plate being provided at the other side thereof with a second connector configured to allow fluid communication with the first connector and the second through-hole, and to be sealingly fastened into the one side of the filter member, the second connector having a predetermined length, wherein the side support portion is provided with a plurality of slits configured to allow water to pass therethrough, wherein the air introducer comprises:

a first body comprising a third circular plate having a third through-hole and a third connector extending to one side of the third circular plate so as to be brought into tight contact with the other side of the filter member;

a second body located at one side of the first body, the second body having a fourth through-hole configured to allow air to be introduced therethrough;

a ball received in the second body, the ball being located on a same line as the fourth through-hole; and a spring received in the second body, the spring being configured to support the ball, wherein air is guided through the third through-hole and the fourth through-hole, and wherein the first body further comprises:

a first extension located at an edge of the one side of the third circular plate so as to be fixed to the other side of the side support portion of the filter receiver; and a second extension extending from the other side of the third circular plate toward an interior of the second body.

2. The water bottle cap according to claim 1, wherein the first extension is fixed to the side support portion of the filter receiver in a state of being depressed against the side support portion of the filter receiver.

3. The water bottle cap according to claim 2, wherein an inner diameter of the first extension is equal to an inner diameter of the side support portion of the filter receiver.

4. The water bottle cap according to claim 1, wherein the second body comprises:

a cover constituted by a third sidewall formed in a cylindrical shape, a bottom plate having the fourth through-hole formed therein, and a fourth sidewall configured to connect the third sidewall and the bottom plate to each other;

an inner sidewall located at an inside of the cover, the inner sidewall extending by a predetermined length, the inner sidewall being cylindrical in shape; and a rib constituted by a plurality of first ribs located on an inner surface of the inner sidewall, the first ribs extending in a height direction while being spaced apart from each other by a predetermined distance and a plurality of second ribs located on an inner upper surface of the bottom plate, the second ribs being radially disposed while protruding by a predetermined height, the second ribs being configured to support one side of the spring, and wherein the ball is configured to move upwards and downwards along the first ribs above the second ribs.

5. The water bottle cap according to claim 4, wherein an upper end of the third sidewall is located under the first extension.

6. The water bottle cap according to claim 5, wherein the first extension is fixed to the side support portion of the filter receiver in a state of being depressed against the side support portion of the filter receiver, wherein an inner diameter of the first extension, an inner diameter of the side support portion of the filter receiver, and an inner diameter of the third sidewall are equal to each other, and wherein an outer diameter of the side support portion of the filter receiver and an outer diameter of the third sidewall are equal to each other.

7. The water bottle cap according to claim 5, wherein the fourth sidewall has an inner diameter gradually decreasing toward the bottom plate.

8. The water bottle cap according to claim 4, wherein the second extension is located so as to enclose an outside of the inner sidewall.

9. The water bottle cap according to claim 4, wherein the spring is a coil located between the ball and the second ribs.

* * * * *